March 24, 1942.  A. B. NEWTON  2,277,138
AIR CONDITIONING SYSTEM
Filed Aug. 31, 1938  2 Sheets-Sheet 1

Inventor
Alwin B. Newton
By George H Fisher
Attorney

March 24, 1942.    A. B. NEWTON    2,277,138
AIR CONDITIONING SYSTEM
Filed Aug. 31, 1938    2 Sheets-Sheet 2
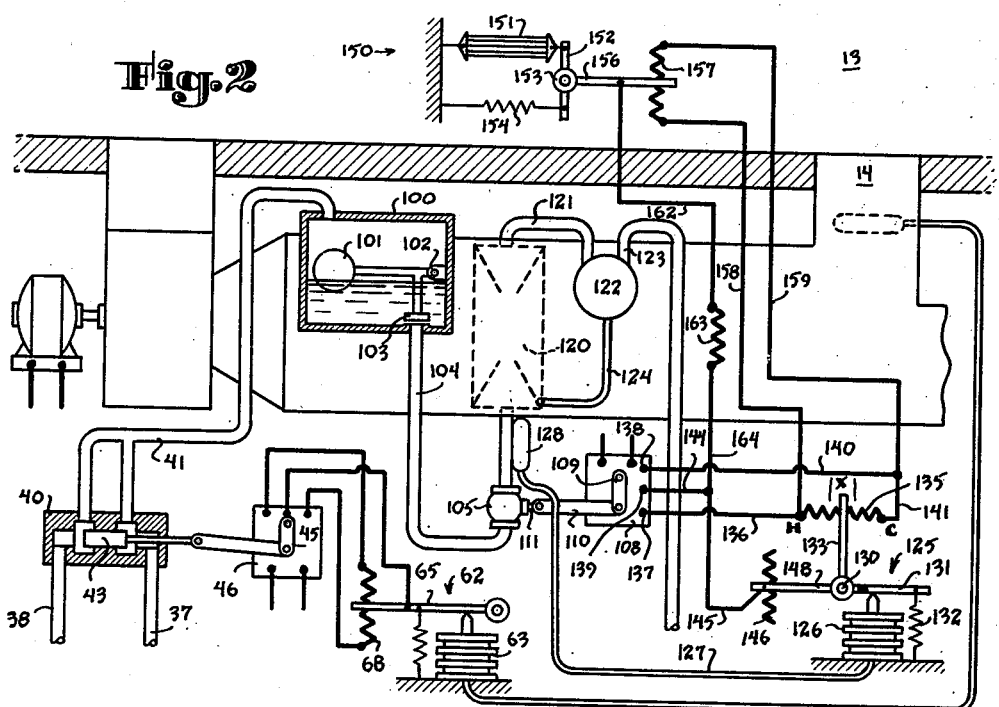
Inventor
Alwin B. Newton
By George H. Fisher
Attorney Patented Mar. 24, 1942

2,277,138

UNITED STATES PATENT OFFICE 2,277,138

AIR CONDITIONING SYSTEM

Alwin B. Newton, Minneapolis, Minn., assignor to Minneapolis-Honeywell Regulator Company, Minneapolis, Minn., a corporation of Delaware Application August 31, 1938, Serial No. 227,727

19 Claims. (Cl. 62—6)

This invention relates to a refrigeration system and more particularly to a novel method of controlling the temperature and effective cooling area of the evaporator in accordance with the cooling requirements of the evaporator.

In carrying out the teachings of my invention, I provide a refrigeration system utilizing two different refrigerants of different densities and different refrigerating characteristics, and control the relative amounts of each that are allowed to enter the evaporator. The difference in the densities of the two refrigerants are utilized to separate the refrigerants after they have been condensed, and a three-way mixing valve controls the relative amounts of the refrigerants that enter the evaporator and compressor, this three-way valve being operated in accordance with some condition it is desired to control.

The system may be operated by utilizing a float type expansion valve and maintaining the coil flooded so that the entire evaporator is at all times utilized for cooling, and the position of the three-way valve will determine the mixture of refrigerants in the evaporator and therefore the temperature thereof, this valve being controlled in accordance with the temperature or other condition it is desired to maintain in the space. An alternative method of operating a system embodying the principles of my invention is to provide an expansion valve which controls the amount of refrigerant entering the evaporator to maintain the temperature at a predetermined value, which value may be controlled by the humidity of the space being conditioned, and controlling the valve which in turn controls the mixture of the refrigerants in accordance with the temperature or other condition in the space, thus controlling the latent heat of vaporization of the refrigerant mixture in the evaporator, which will in turn control the effective cooling area of the evaporator. In this way, the amount of sensible heat removal is controlled by controlling the mixture of the refrigerants which in turn controls the effective cooling surface of the evaporator, and the amount of latent heat removal is controlled by controlling the temperature of the refrigerant in the evaporator by proper adjustment of the expansion valve.

It is therefore an object of my invention to provide a refrigeration system having novel means for controlling the cooling capacity of the evaporator.

More specifically, it is an object of my invention to provide a refrigeration system utilizing two refrigerants of different densities and different cooling characteristics, and controlling the relative amounts of the refrigerants that enter the evaporator, and therefore the cooling effect of the evaporator, in accordance with the condition of a space being controlled.

Another object of my invention is the provision of a refrigeration system utilizing two different refrigerants, an expansion valve for controlling the amount of refrigerants entering the evaporator, means for controlling the expansion valve to maintain a predetermined temperature at the evaporator, which temperature may be varied in accordance with the humidity in the space to be controlled, and controlling the relative amounts of the refrigerants flowing to the expansion valve, and therefore the effective cooling area of the evaporator, in accordance with the temperature of the air or other condition in the space to be controlled.

A further object of my invention is the provision of a refrigeration system of the type wherein a float type valve is provided for controlling the flow of refrigerant to an evaporator having a large number of small diameter parallel passes or pipes, with means for positively causing refrigerant to flow through the evaporator in such a manner that the liquid refrigerant in the evaporator will always be at the same level.

Other objects and advantages will become apparent upon reference to the specification, claims and appended drawings in which like reference characters represent like parts in the various views, and in which—

Figure 2 is a view of a second form of system embodying my invention, and

Figure 3 is a chart illustrating graphically the operation of the systems of Figures 1 and 2.

Figure 1:
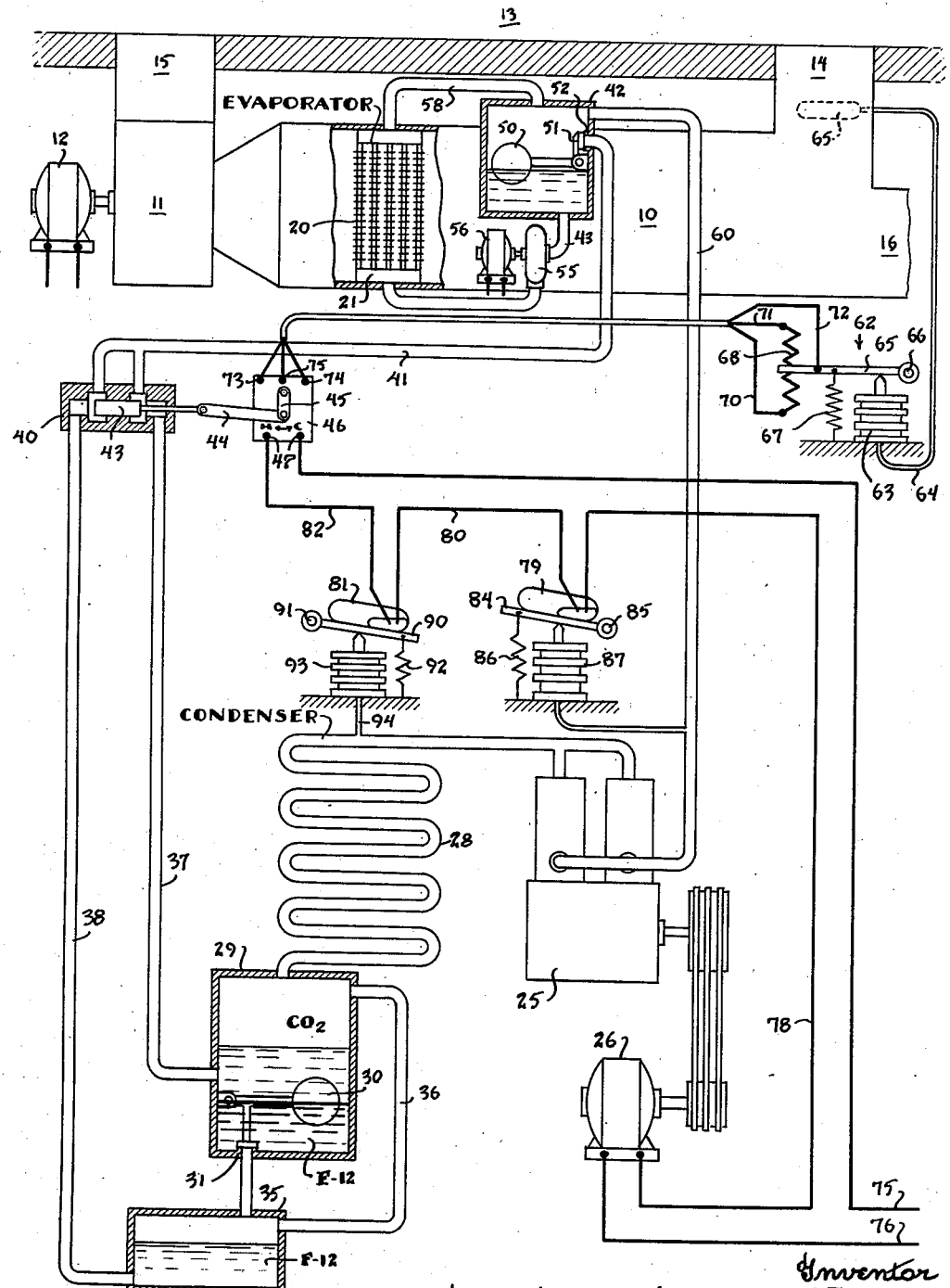
Figure 1 is a schematic view of one form of a system embodying my invention.

Referring more particularly to Figure 1, a refrigeration system is illustrated wherein an evaporator of the flooded type is shown and wherein two refrigerants having different characteristics such as $CO_2$ and "Freon" or "F-12" are supplied in varying proportions to the evaporator and compressor in accordance with the load on the evaporator. Referring now to Figure 3 the curve AB illustrates the refrigerating capacity of a compressor having 2000 cubic inches per minute displacement working under constant head pressure and varying suction pressures in a system utilizing the refrigerant "Freon" and a condenser maintained at 80° F. It will be seen from this curve that the higher the suction temperature is, the greater is the refrigerating capacity of the compressor. The curve CD is a similar curve wherein the refrigerant is composed of 100% ammonia, and the curve EF similarly represents the compressor capacity for varying suction temperatures in a system using 100% carbon dioxide as the refrigerant the compressor being the same as that described above. The line GH shows the coil capacity for an evaporator having one square foot of face area and operating in an atmosphere having a 67° wet bulb temperature, the evaporator used to obtain these curves being of a standard make and having a depth of about six inches. The intersection Y of the line GH representing coil capacity and the line AB representing compressor capacity represents the capacity of the refrigeration system when 100% "Freon" is used, using an evaporator and compressor of the specifications described above. It will be seen that the temperature of the coil will be approximately 48° F. and the refrigerative capacity will be approximately .4 ton as indicated at Y. If now the refrigerant is composed of 100% $CO_2$, the intersection X of the lines GH and EF indicates the temperature of the evaporator coil and the refrigerative capacity of the system which will be approximately 1.1 tons of refrigeration at 15° F. evaporator temperature. It will therefore be seen that if the coil area is maintained at a constant value and if a variable mixture of refrigerants is used, the suction temperature and the amount of refrigeration possible may be varied, the amount of refrigeration increasing as the amount of $CO_2$ is increased and the amount of "Freon" is decreased. The compressor capacity curve for a mixture of the refrigerants would lie between lines AB and EF, depending upon the mixture, and the intersection of such curve with the line GH would represent the balance point or the capacity of the system for the particular mixture of refrigerants used.

Referring back to Figure 1 a system is disclosed which operates on the principle discussed above. An air conditioning chamber is indicated by the reference character 10 and a blower 11 operated by means of a motor 12 draws air from the space 13 through the inlet 14 and draws the air through the chamber 10 and exhausts the same back into the space 13 through the outlet 15. Fresh air may be drawn into the chamber 10 through the inlet 16 and mixed with the return air. Suitable damper means may be provided to regulate the amount of fresh and recirculated air or if desired, all fresh air may be utilized.

Mounted within the chamber 10 is an evaporator 20 of a refrigeration system and this evaporator may be composed of a plurality of parallel coils having their inlets connected to a distributor 21, these coils being of small size and provided with cooling fins so as to increase the cooling surface of the evaporator.

A compressor 25 driven by a motor 26 is provided for circulating refrigerant through the evaporator 20 and this compressor communicates on its high pressure side with a condenser 28 which in turn communicates with a receiver 29. Since the invention contemplates the use of two different refrigerants and the control of the relative proportions of the refrigerants entering the evaporator, means are provided for separating the refrigerants so that the relative amounts that are supplied to the evaporator may be effectively controlled and the varying densities of the two refrigerants are utilized to effect this separation. As the refrigerants enter the receiver 29 from the condenser 28 the denser of the two refrigerants which is the "Freon" will go to the bottom of the receiver 29 whereas the lighter of the refrigerants or the $CO_2$ will float on top of the "Freon." Pivoted within the receiver 29 is a float 30 controlling a valve 31 which controls the flow of the "Freon" into a second receiver 35. As the amount of "Freon" in the receiver 29 increases, the float 30, which is designed to float on the "Freon," but not on the $CO_2$, will open the valve 31 and allow the "Freon" to pass into the receiver 35. An equalizing connection 36 provides communication between the upper portions of the two receivers to equalize the pressures therein. The outlet of the receiver 29 is positioned sufficiently high in the receiver so that only $CO_2$ flows from this outlet and a pipe 37 provides communication between the receiver 29 and a three-way mixing valve 40. The outlet of the receiver 35 communicates by means of a pipe 38 with the three-way valve 40 and the outlet of this mixing valve 40 communicates by means of a pipe 41 with the inlet of the float valve 42. The valve 40 is shown to comprise a slidable valve element 43 which is connected by means of a link 44 to an arm 45 of a motor 46, this motor being operated in a manner to be hereinafter described. It will be apparent that the position of the valve element 43 with respect to the valve chamber will control the relative amounts of "Freon" and $CO_2$ that are permitted to pass to the pipe 41. With the valve element in the extreme right position the inlet 37 to the valve 40 is entirely closed and "Freon" alone will be permitted to pass through the valve and the pipe 41 but with the valve element in the extreme left position only $CO_2$ will pass through the valve. As the valve element moves towards the right the amount of "Freon" that passes through the valve increases and the amount of $CO_2$ decreases.

The valve 42 is illustrated as being a low pressure float type expansion valve of a type well known in the art and comprises a float member 50 pivoted to the interior of the tank and controlling the position of a valve element 51 with respect to the inlet 52. This valve insures the maintenance of a constant amount of refrigerant within the chamber 42 and the liquid refrigerant passes from this chamber through the outlet 43 and into the evaporator 20.

Considerable difficulty has been experienced in the past in utilizing a float type expansion valve with an evaporator of the type having a plurality of very small diameter parallel passes in maintaining the evaporator in a flooded condition by reason of the small size of the coils of the evaporator. In order to overcome this difficulty I have provided a pump 55 operated by a motor 56 between the outlet of the valve chamber 42 and the inlet of the evaporator to insure that the evaporator will at all times be maintained in a flooded condition. In this way the effective cooling surface of the evaporator is maintained at a constant value so that the refrigerating effect is effectively controlled by controlling the mixture of the refrigerants admitted thereto. The refrigerant flows from the outlet of the evaporator 20 through a pipe 58 back to the upper portion of the valve chamber 42 and the evaporated refrigerant is withdrawn by means of the pipe 60 and flows back to the inlet of the compressor 25.

The motor 46 for controlling the mixing valve 43 may be a proportioning motor of the type illustrated in Patent 2,028,110 issued to D. G. Taylor January 14, 1936. The operation of this motor is shown as being controlled by a controller 62 which responds to the temperature of the air in the space being conditioned. This controller may consist of a bellows 63 connected by means of a capillary tube 64 to a bulb 65 positioned in the return air inlet 14, this tube, bulb, and bellows being provided with a suitable volatile fill whereupon the bellows 63 will expand in response to a temperature rise in the return air inlet 14. An arm 65 pivoted at 66 is biased by means of a spring 67 into engagement with the upper portion of the bellows 63 and this arm is arranged to sweep over the potentiometer resistance 68. Conductors 70, 71, and 72 connect the extremities of resistance 68 and the arm 65 with the terminals 73, 74, and 75 of the motor 46, respectively. As will be apparent upon a study of the Taylor patent mentioned above the arm 45 of the motor 46 will assume positions corresponding to the position of the arm 65 of the controller 62 with respect to the resistance 68. As the temperature of the air entering the inlet 14 rises and arm 65 moves upwardly over resistance 68 the arm 45 will move to the left or in a clockwise direction a corresponding amount and upon a fall in temperature the arm 45 will be moved in the opposite direction an amount corresponding to the fall in temperature.

It will now be seen that as the temperature in the space 13 rises and arm 45 moves to the left moving the valve 43 in the same direction, the amount of "Freon" admitted to the evaporator 20 is reduced whereas the amount of $CO_2$ is increased, thus reducing the temperature of the evaporator which in turn will cause the temperature of the air flowing thereover to be lower and in this way the temperature of the space is effectively controlled.

The motor 46 is provided with an auxiliary switch 47 which is arranged to open when the motor reaches its limit of travel wherein all "Freon" is supplied to the evaporator. This switch is provided for stopping the compressor at this time. Lines 75 and 76 connected to a suitable source of power (not shown) are provided for supplying power to the compressor motor 26. The line 75 is connected directly to one of the terminals of the auxiliary switch 47 of motor 46 and the other line 76 is connected directly to one of the terminals of the motor 26. The other terminal of the motor 26 is connected by means of a conductor 78 to a mercury switch 79 which is in turn connected by means of conductor 80 to a second mercury switch 81 and this switch is connected by means of conductor 82 to the other terminal of motor 46. It will be apparent that when the switches 47, 79 and 81 are closed, power will be supplied to both the motors 26. The switch 79 is carried by an arm 84 pivoted at 85 and biased by means of a spring 86 into engagement with a bellows 87 having its interior connected to the pipe 60 which leads to the inlet of compressor 25. As the suction pressure on the compressor drops, the bellows 87 will contract and if this pressure drops to a low enough value the switch 79 will be tilted to open position as will be apparent, thus interrupting the operation of the compressor motor 26. The switch 81 is carried by an arm 90 pivoted at 91 and biased by means of a spring 92 into engagement with a bellows 93 connected by a pipe 94 to the high pressure side of the compressor 25. Upon expansion of the bellows 93 a sufficient amount due to the existence of a high enough pressure on the high pressure side of the compressor, the switch 81 will be tilted to open position. It will now be apparent that as long as the suction pressure and the high side pressure on the compressor are between predetermined values the switches 79 and 81 will be both closed and if the switch 47 is closed due to a call for cooling by thermostat 62, the compressor motor 26 will be in operation.

It will now be seen that with the system illustrated in Figure 1 the evaporator is maintained in a flooded condition so that the cooling surface thereof is maintained constant and the refrigerating effect thereof is varied by varying the relative amounts of the two refrigerants which is in turn done in accordance with the temperature in the space being conditioned. While the motor 46 has been illustrated as being operated solely in response to the temperature in the space 13 it should be understood of course that this motor may be operated in response to other conditions such as humidity or a combination of temperature and humidity of the space for example so as to maintain a desirable effective temperature in the space.

Referring now to Figure 2 the principles of my invention are embodied in a sytem wherein the temperature of the evaporator is maintained at a constant value but which value may be varied in accordance with the humidity in the space, and wherein the effective cooling surface of the evaporator is controlled in accordance with the temperature of the space by varying the relative amounts of the refrigerants supplied thereto. Referring again to the chart of Figure 3 it will be seen that to maintain a suction temperature of 48° F., using 100% $CO_2$, a coil having 5.5 square feet face area must be used, as represented by the point 2 of the line ST which represents the capacity of a coil of 5.5 square feet face area for different suction temperatures. The capacity of the system using 100% $CO_2$ with a coil of 5.5 square feet face area will be approximately 2.3 tons of refrigeration, as indicated by the intersection 2 of the compressor capacity curve EF and the line ST, whereas with 100% "Freon," the capacity of the system is .4 ton with a coil of 1 square foot face area at 48° F., assuming as before, a compressor having 2000 cubic inches per minute displacement and a condenser temperature of 80° F. By maintaining a constant suction temperature of 48° F., the coil capacity, and accordingly the capacity of the system, may be varied by varying the mixture of refrigerants, the intersection of the compressor capacity curve for any given mixture of refrigerants, with the line MN, representing the capacity of the system. Accordingly it will be apparent that as the amount of "Freon" is reduced and the amount of $CO_2$ is increased, with the temperature at the evaporator maintained at 48°, the tons of refrigeration will be increased by increasing the effective cooling area of the evaporator. This forms a very effective way of controlling both temperature and humidity with my system. The temperature is controlled by varying the coil surface which is utilized for cooling, and the humidity in the space is controlled by controlling the temperature of the coil.

Referring again to Figure 2 the compressor and the receivers for the two refrigerants have for simplicity's sake been omitted but it is understood that "Freon" will flow into the mixing valve 40 through the pipe 38 and that $CO_2$ will flow to this valve through the pipe 37. The operation of this valve is controlled as in Figure 1 by the proportioning motor 46 operated by the temperature controller 62 so that as the temperature in the space 13 increases and the bellows 63 expands the arm 65 will move upwardly over the resistance 68 and cause movement of the arm 45 of the motor 46 to the left or in a clockwise direction so that the amount of "Freon" that flows from the valve 40 through the pipe 41 is reduced and the amount of $CO_2$ is increased. The mixture of refrigerant flowing through the pipe 41 flows into a chamber 100 of a high pressure float valve comprising a float 101 pivoted at 102 and controlling the valve element 103. A pipe 104 connects the outlet of the valve 100 with the inlet of a second valve 105 which is an expansion valve and the position of which is controlled by means of a motor 108 similar to the motor 46 and having its operating arm 109 connected by means of a link 110 with the valve stem 111 of the valve 105. The float valve 100 is not for the purpose of maintaining the evaporator 120 in a flooded condition as in Figure 1 but is provided for the purpose of insuring that liquid refrigerant only passes to the expansion valve 105. In other words, if the level of the liquid refrigerant in the valve 100 drops below a vertain value the valve will be closed so that no refrigerant passes to the expansion valve 105 until sufficient refrigerant has passed to the valve 100. The outlet of the evaporator 120 communicates by means of a pipe 121, suction trap 122 and pipe 123 with the inlet of the compressor 25. Any liquid refrigerant caught by the trap 123 flows back to the evaporator by way of the pipe 124.

The motor 108 is controlled by the controller 125 which controller comprises a bellows 126 connected by means of a capillary tube 127 with a bulb 128 mounted in intimate relationship with the inlet of the evaporator 120 and this tube, bulb, and bellows is provided with a suitable volatile fill so that the bellows 126 will expand or contract as the temperature at the inlet of the evaporator 120 rises or falls. Operated by the bellows 126 is a lever pivoted at 130 and having an arm 131 biased by means of a spring 132 into engagement with the upper portion of the bellows 126. An arm 133 of this lever is arranged to move over a potentiometer resistance 135, the left end of this resistance being connected by means of a conductor 136 with the terminal 137 of the motor 108. The terminal 138 of this motor is connected by means of conductors 140 and 141 with the right end of resistance 135 and the center terminal 139 is connected by means of conductors 144 and 145 and the center tapped resistance 146 with an arm 148 which is connected with the arm 133.

As the temperature at the inlet of the evaporator increases the bellows 126 of thermostat 125 will expand and move the arm 133 to the left across resistance 135 which will in turn cause movement of the arm 109 of motor 108 a corresponding amount for closing the expansion valve 105. This will reduce the quantity of refrigerant which enters the evaporator 120 and as the compressor displacement remains constant this reduction in quantity of refrigerant will cause the temperature of the evaporator to lower. Conversely upon fall in temperature of the evaporator 120 the bellows 126 will contract for causing movement of the arm 133 to the right across resistance 135 for thereby causing valve 105 to be adjusted for supplying a larger quantity of refrigerant to the evaporator. This increase in flow of refrigerant to the evaporator will counteract the tendency of the temperature to lower. The thermostat 125 therefore controls the expansion valve 105 in a manner to maintain the evaporator temperature substantially constant. The operation of the motor 108 may be compensated by the humidity in the space 13 so that the temperature of the evaporator may be maintained at different values depending upon the humidity in the space 13. For this purpose a humidity responsive device indicated generally at 150 may be located in the space 13, this device comprising a humidity responsive element 151 fixedly held at one end and having its other end connected to a lever 152 pivoted at 153 and being biased by means of a spring 154 in a direction to maintain the humidity responsive element 151 in a stretched condition. The lever 152 operates an arm 156 which travels over a resistance 157 which is in turn connected at its lower end to the resistance 135 by means of a conductor 158, the opposite end of the resistance 157 being connected to the resistance 135 by means of conductors 159 and 141. The arm 156 is connected to the terminal 139 of the motor 108 by means of a conductor 162, a resistance element 163 which, if desired, may be adjustable and conductors 164 and 144. It will now be seen that the main controller consisting of the arm 133 and resistance 135 and the controller comprising the arm 156 and the resistance 157 are connected in parallel to the proportioning motor 108. The provision of the resistance 163 in the circuit to the arm 156 has the effect of desensitizing the controller 150. In other words if the motor 108 moves from one to the other of its extreme positions in response to movement of arm 156 throughout its entire range of movement the same movement will be imparted to the motor 108 in response to movement of the arm 133 throughout the distance X over the resistance 135. The effect of movement of the arm 156 with respect to resistance 157 in response to a change in humidity in the space 13 has the effect of shifting the control range X of the controller 125 so that different temperatures will be maintained in the evaporator 120. The center tapped resistance 146 connected in series with the control arm 133 of the controller 125 insures that the control range X of this controller will be of the same length regardless of whether this range is positioned at the center or toward the extremities of resistance 135.

It is believed that the operation of this system will now be apparent to those skilled in the art. The temperature of the evaporator is maintained at a substantially constant value by the thermostat 125 which positions the expansion valve 105. Thus upon rise in evaporator temperature this thermostat will act to position valve 105 for decreasing the amount of refrigerant supplied to the evaporator which will counter-act the tendency of the temperature to increase. Conversely upon decrease in evaporator temperature the thermostat 125 will act to increase the amount of refrigerant supplied to the evaporator for maintaining its temperature substantially constant. This evaporator temperature responsive thermostat is in turn adjusted by the humidity controller 150, this controller serving to raise the setting of the evaporator thermostat upon fall in relative humidity while lowering the setting of this thermostat upon rise in humidity. This action serves to maintain the humidity of the space substantially constant. The temperature of the space is maintained constant by means of the space thermostat 62 which positions the valve 43 for determining the relative quantities of "Freon" and CO₂ which are supplied to the evaporator. Thus upon rise in space temperature the thermostat 62 will position valve 43 for increasing the quantity of CO₂ supplied while decreasing the quantity of 'Freon" supplied to the evaporator. This will cause the mixture of refrigerant in the evaporator to evaporate at a lower temperature and in response to the tendency of the evaporator temperature to lower the thermostat 125 will position the expansion valve 105 for increasing the quantity of refrigerant supplied to the evaporator for maintaining the evaporator temperature constant. This increase in refrigerant supplied to the evaporator will fill the evaporator with liquid refrigerant to a greater extent and thereby increase the amount of cooling performed. Upon fall in space temperature, the space thermostat 62 will position the valve 43 for decreasing the proportion of CO₂ while increasing the proportion of "Freon" supplied to the evaporator. This will cause the evaporator temperature to tend to rise and in response to this tendency the thermostat 125 will position the expansion valve 105 for reducing the amount of refrigerant supplied to the evaporator. This reduction in supply of refrigerant to the evaporator will cause the evaporator to be less filled with liquid refrigerant with consequent reduction of its effective cooling surface. This system therefore serves to vary the amount of cooling surface in accordance with temperature while varying the temperature of the active cooling surface in accordance with relative humidity.

Thus the system of this figure differs from that of Figure 1 in that the cooling area of the evaporator is controlled in accordance with the temperature of the space by varying the relative proportions of the refrigerants supplied to the evaporator and the humidity of the space is controlled by controlling the temperature of the evaporator whereas in Figure 1 the effective cooling surface of the evaporator is maintained constant by maintaining the evaporator in a flooded condition, the sole control in Figure 1 being over the temperature of the evaporator by varying the relative amounts of refrigerants supplied thereto.

While the temperature of the coil has been illustrated as controlled in accordance with the humidity of the space and the cooling surface of the coil has been controlled by the temperature it should be understood that these two conditions at the evaporator may be controlled in response to any other conditions which it is desired to maintain. Also while the invention has been described in connection with the use of "Freon" and CO₂ it should be understood that the invention is not limited to the use of these two refrigerants but may be used with any two refrigerants having different densities and refrigerating capacities and which may be readily separated so that the mixture of the refrigerants can be readily controlled.

Having described the preferred forms of my invention many modifications may become apparent to those skilled in the art and it should be understood that my invention is to be limited only by the scope of the appended claims.

I claim as my invention:

1. In a refrigeration system including an evaporator and an expansion means, a supply of refrigerant having certain characteristics, a supply of refrigerant having characteristics differing from said first mentioned refrigerant, means for passing the refrigerants through the expansion means to the evaporator, and means for selectively controlling relative amounts of the refrigerants passing through the expansion means.

2. In a refrigeration system including an evaporator and an expansion means, a supply of refrigerant having certain characteristics, a supply of refrigerant having characteristics differing from said first mentioned refrigerant, means for passing the refrigerants through the expansion means to the evaporator, and means responsive to a condition indicative of the load upon the system for controlling the relative amounts of the respective refrigerants passing through the expansion means.

3. In a refrigeration system including an evaporator and an expansion means, a source of refrigerant of relatively high volatility, a source of refrigerant of relatively low volatility, means for mixing the refrigerants and passing them through the expansion means into the evaporator, and means for varying the relative amounts of the refrigerants passed into the evaporator to control the cooling effect of said evaporator.

4. In a refrigeration system including an evaporator and an expansion means, a source of refrigerant of relatively high volatility, a source of refrigerant of relatively low volatility, valve means for mixing the refrigerants and passing them through the expansion means into the evaporator, and means responsive to a condition indicative of the load on the refrigeration system in control of said valve means.

5. A refrigeration system including an evaporator, a float controlled expansion valve for controlling the flow of refrigerant to said evaporator, means for supplying a mixture of refrigerants having different cooling characteristics to said expansion valve, and means for controlling the relative amounts of the different refrigerants supplied to said expansion valve to control the cooling effect of said evaporator.

6. A refrigeration system including an evaporator, a float controlled expansion valve for controlling the flow of refrigerant to said evaporator, means for supplying a mixture of refrigerants having different cooling characteristics to said expansion valve, means for controlling the relative amounts of the different refrigerants supplied to said expansion valve to control the cooling effect of said evaporator, and pumping means interposed between said expansion valve and said evaporator.

7. In a refrigeration system utilizing two different refrigerants having different densities and different cooling characteristics, a compressor, a condenser, an evaporator, means connecting the outlet of the compressor and the inlet of the condenser, means connected to the outlet of the condenser for separating the refrigerants, means for conducting the refrigerants from the separating means to the inlet of the evaporator, an expansion means for reducing the pressure of the refrigerants before they reach said evaporator, and means for controlling the relative amounts of the respective refrigerants reaching the expansion means to control the cooling effect of the evaporator.

8. In a refrigeration system utilizing two different refrigerants having different densities and different cooling characteristics, a compressor, a condenser, an evaporator, means connecting the outlet of the compressor and the inlet of the condenser, means connected to the outlet of the condenser for separating the refrigerants, means for conducting the refrigerants from the separating means to the inlet of the evaporator, an expansion means for reducing the pressure of the refrigerants before they reach said evaporator, means for controlling the relative amounts of the respective refrigerants reaching the expansion means to control the cooling effect of the evaporator, and means for controlling the amount of refrigerant flowing through said expansion means.

9. In a refrigeration system utilizing two different refrigerants having different cooling characteristics, an expansion means for controlling the flow of said refrigerants into the evaporator, means for operating said expansion means to maintain the temperature of said evaporator constant, and means for controlling the effective cooling area of said evaporator by controlling the relative amounts of the refrigerants supplied to said expansion means.

10. In a refrigeration system for cooling air, said refrigeration system utilizing two different refrigerants having different cooling characteristics, an expansion means for controlling the flow of said refrigerants into the evaporator, means for operating said expansion means to maintain the temperature of said evaporator constant, means responsive to a condition of the air being cooled for varying the temperature which is maintained in the evaporator by the expansion means, and means responsive to another condition of the air being cooled for controlling the relative amounts of refrigerants supplied to the expansion means whereby the latent heat of vaporization of the refrigerant in the evaporator is controlled in accordance with the requirements of this second condition.

11. A method of refrigeration which comprises circulating a mixture of refrigerants having different cooling characteristics through an evaporator and controlling the cooling effect of said evaporator by controlling the relative amounts of the refrigerants circulated therethrough.

12. A method of refrigeration which comprises circulating a mixture of two different refrigerants having different cooling characteristics through an evaporator, maintaining constant the degree of flooding in the evaporator, and controlling the relative amounts of the refrigerants in the mixture to control the temperature of the evaporator.

13. A method of refrigeration which comprises circulating a mixture of two different refrigerants having different cooling characteristics through an evaporator, controlling the amount of the mixture supplied to the evaporator to maintain the temperature of the evaporator at a predetermined value, and controlling the proportions of the refrigerants constituting the mixture to control the latent heat of vaporization of the mixture and the effective cooling area of the evaporator.

14. A method of air conditioning which comprises circulating a mixture of two different refrigerants having different cooling characteristics through an evaporator, controlling the amount of the mixture supplied to the evaporator to maintain the temperature of the evaporator at a predetermined value, adjusting the temperature maintained at the evaporator in accordance with the humidity of the air being conditioned, and controlling the proportions of the refrigerants constituting the mixture in accordance with the temperature of the air being conditioned whereby the effective cooling area of the evaporator is controlled in accordance with the sensible cooling load thereon.

15. In a refrigeration system for cooling air, said refrigeration system utilizing two different refrigerants having different cooling characteristics, an evaporator, first control means for controlling the total amount of refrigerant entering said evaporator, means responsive to a first condition of the air being cooled for controlling said first control means, second control means for controlling the relative quantities of the two refrigerants entering said evaporator, and means responsive to another conidtion of the air being cooled for controlling said second control means.

16. In a refrigeration system for cooling air, said refrigeration system utilizing two different refrigerants having different cooling characteristics, first valve means for controlling the total amount of refrigerant entering said evaporator, control means influenced by the temperature of the evaporator for controlling said first valve means to maintain a constant evaporator temperature, means responsive to a first condition of the air for adjusting said control means, second valve means for controlling the relative quantities of refrigerant in said evaporator, and means responsive to another condition of the air for controlling said second valve means.

17. In a refrigeration system for cooling air, said refrigeration system utilizing two different refrigerants having different cooling |characteristics, first valve means for controlling the total amount of refrigerant entering said evaporator, control means influenced by the temperature of the evaporator for controlling said first valve means to maintain a constant evaporator temperature, means responsive to the humidity of the air for adjusting said control means, second valve means for controlling the relative quantities of the two refrigerants entering said evaporator, and means responsive to the temperature of the air for controlling said second valve means.

18. In a refrigeration system utilizing two different refrigerants having different cooling characteristics, an evaporator, first means for controlling the total quantity of refrigerant entering said evaporator for controlling the temperature of said evaporator, and second means for controlling the proportions of said refrigerants entering said evaporator.

19. In a refrigeration system utilizing two different refrigerants having different cooling characteristics, an evaporator, means for supplying said refrigerants to said evaporator, valve means for controlling the relative proportions of said refrigerants entering said evaporator, thermostatic means for adjusting said valve means, and means for controlling the quantity of refrigerant evaporated in said evaporator.

ALWIN B. NEWTON.